Feb. 26, 1963 T. S. KULKA 3,078,987

TAPE HOUSING AND RETAINER

Filed Oct. 17, 1958 3 Sheets-Sheet 1

INVENTOR
THOMAS S. KULKA

BY Almon D. Nelson
ATTORNEY

Feb. 26, 1963 T. S. KULKA 3,078,987

TAPE HOUSING AND RETAINER

Filed Oct. 17, 1958 3 Sheets-Sheet 2

INVENTOR
THOMAS S. KULKA

BY Rolmon A. Nelson
ATTORNEY

INVENTOR
THOMAS S. KULKA

BY Elmer S. Nelson
ATTORNEY

United States Patent Office 3,078,987
Patented Feb. 26, 1963

3,078,987
TAPE HOUSING AND RETAINER

Thomas S. Kulka, 2108 Payne Ave., Cleveland 14, Ohio
Filed Oct. 17, 1958, Ser. No. 767,866
5 Claims. (Cl. 206—59)

This invention relates to the utilization and storage of tapes commonly employed in the magnetic recording of sound or for film used in motion pictures, and more particularly to devices for housing or partially housing the reels upon which such tape is commonly wound and for simultaneously preventing unwinding of the tape from such reels.

This application is a continuation-in-part of my co-pending application, Serial No. 494,771, filed March 16, 1955, for "Combined Housing and Tape Retaining Means for Tape Holding Reels," now issued into Patent No. 2,867,318, January 6, 1959.

It is an object of this invention to provide a combined housing and tape retaining means for tape holding reels which may be economically manufactured from readily available materials and in which the reel may be inserted therein in proper position for preventing unwinding of the tape by a simple manual operation.

Further objects and advantages of the invention will be apparent from the following description taken in conjunction with the accompanying drawings, wherein:

FIG. 1 is a view in perspective, showing a combined housing and tape retaining means constructed in accordance with this invention and in which the housing comprises a box having an open top and with a hinged cover for closing the same, the tape retaining means comprising an endless band, and a member associated therewith having a thickness greater than the thickness of said band, a reel being shown within the box;

Figures 15, 16, 17:
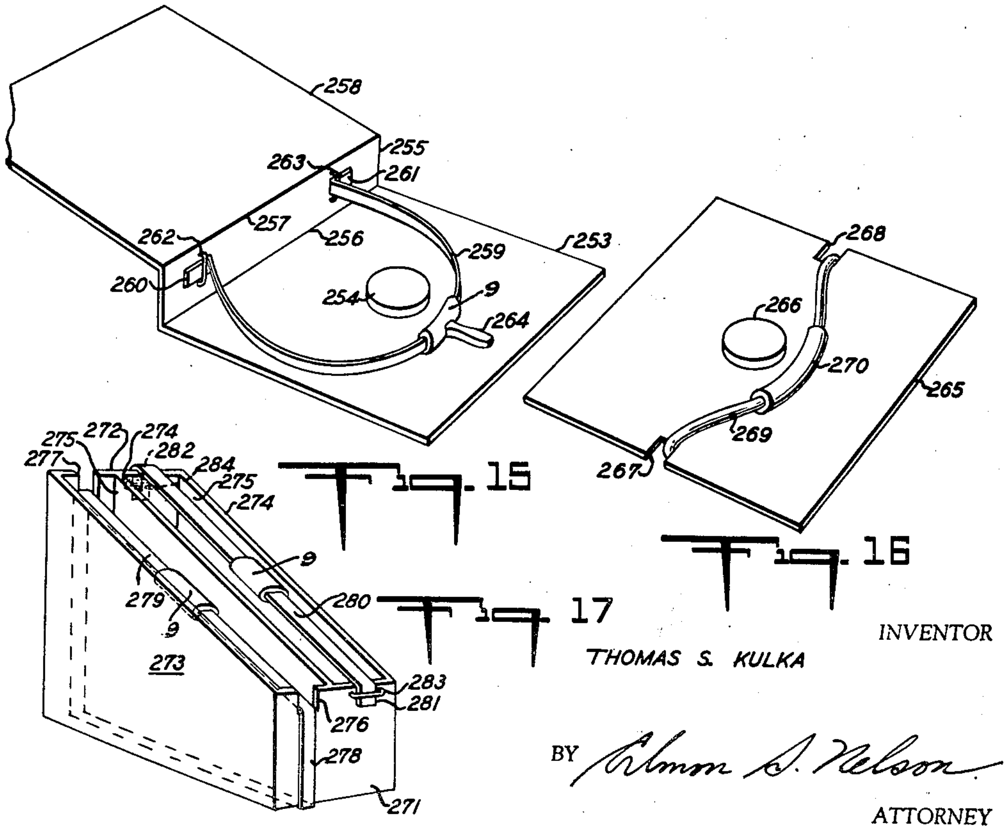

FIG. 15 is a view in perspective showing an album type housing and tape retaining means for tape receiving reels in which a stud is provided for engaging the spindle receiving aperture in the reel and in which a tape engaging means having a member associated therewith having a thickness greater than the thickness of said means is provided for retaining the reel in the album and for preventing inadvertent unwinding of the tape thereon;

FIG. 16 is a view in perspective, showing a reel supporting and tape holding means comprising a base together with means for engaging the tape on the reel to retain the same on the base and prevent inadvertent unwinding of such tape, there again being provided means for preventing entry of the tape holding means between the tape and a flange of the reel; and, FIG. 17 is a fragmentary view in perspective, showing a reel receiving chest and two types of tape retaining means for retaining the reels in the chest and also for preventing inadvertent unwinding of the tape thereon.

Figure 1:
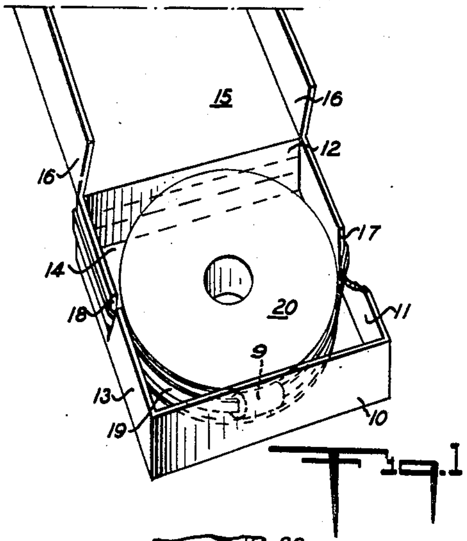

With continued reference to the drawing there is shown, in FIG. 1, one form of a combined housing and tape retaining means constructed in accordance with this invention and which may well comprise side walls 10, 11, 12, and 13, and a bottom wall 14, providing a box open at the top. A cover 15 may be hingedly secured to the side wall 12, and such cover 15 may be provided with depending flanges 16 which serve to surround a portion of the side walls 10, 11, and 13 when the cover 15 is in closed position. Provided in side wall 11 is a slit 17 disposed substantially midway of the length thereof and extending vertically, slightly more than one-half the total height of the side wall 11. Also provided in the side wall 13 is a slit 18 similar in location and dimensions to the slit 17 in side wall 11.

Tape retaining means in the form of an endless band 19 is disposed in the slits 17 and 18, as clearly shown in FIG. 1, and such band extends across the box and along the side walls 11 and 13 and around the side wall 11. Of course, if desired, the retaining band 19 may be secured together at its ends by any suitable means rather than utilizing an endless band. Such band 19 may be formed of rubber or any other suitable elastic or non-elastic material, depending on the physical characteristics of the member 9. The member 9 is shown diagrammatically, and may be a sleeve slidably mounted on the band, or it may be integral with the band, or it may be an insert, i.e., connected to spaced ends of the band. If the band 19 is resilient, the member may be formed of nonresilient material. On the other hand, the member 9 may be formed of resilient material, in which case the band 19 may be of non-resilient material. Obviously, both the band 19 and member 9 may be made of resilient material. Also, if desired, a series of members 9 can be associated with the band 19. These various arrangements may be employed with any or all of the different species disclosed herein.

Figure 2:
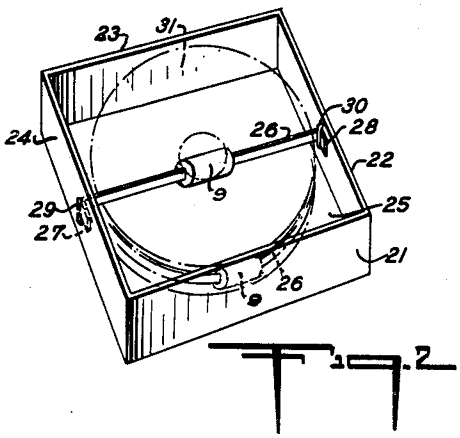
FIG. 2 is a perspective view similar to FIG. 1, and showing a different form of tape retaining means.
Figure 3:
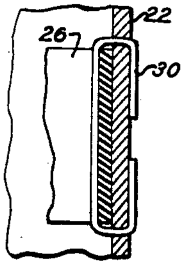
FIG. 3 is a fragmentary sectional view showing one manner of securing the band to the walls of the box.

With the box empty the band 19 extend thereacross between the slits 17 and 19, with a short band 26, as shown in FIG. 2, but when it is desired to position a reel of tape in such box, the reel 20, as shown in FIG. 1, is positioned therein with the member 9 of the band 19 within the box engaged between the flanges of the reel and in engagement with the tape thereon, and, of course, the band 19 may engage between the reel flanges adjacent the wall 10 or may be engaged between the reel flanges adjacent the wall 12. In either event, the member 9 will resiliently engage the tape and prevent unwinding thereof and, at the same time, since the same is positioned between the flanges of the reel will prevent inadvertent displacement of the reel from the box. Due to the elasticity of the band 19 or the member 9, the reel will be urged against the wall opposite that from the side of the reel engaged by the band and will, of course, securely hold the same in place. As will be seen, the reel 20 may be conveniently inserted in the box with the band 19 properly engaging the tape merely by sliding the reel in at an inclinded position until such time as the reel is in proper location to move downwardly into the box. Thereafter, the cover 15 may be closed, thereby completely housing and protecting the reel of the tape, and, of course, the tape will be prevented from inadvertently unwinding by the above-described engagement of the member 9 and the band 19.

Since the above-described form of the invention may be very economically manufactured by conventional methods of box making and, of course, the box may be manufactured of cardboard, plastic, or any other suitable material and, further, since the tape retaining means may merely comprise a conventional band and the member 9 and the same may be assembled with the box by merely inserting it in the slits 17 and 18, the cost of such combined housing and tape retaining means may be maintained at an absolute minimum and will not materially add to the cost of the tape and reel which may be supplied together with the box or housing and tape retaining means. Furthermore, the housing and tape retaining means will have a relatively long life, since the only part likely to deteriorate is the band which may, of course, be conveniently replaced at any time with a conventional band available at any stationery supply house or the like.

A slightly modified form of housing and tape retaining means is shown in FIG. 2, and this form of the invention may well comprise side walls 21, 22, 23, and 24, together with a bottom wall 25, thereby providing a box open at the top similar to the box described above in connection with FIG. 1. In this form of the invention, however, there are no slits provided in the side walls, but the tape engaging and retaining means 26 takes the form of an elastic band having its ends 27 and 28 secured to opposite side walls 22 and 24 substantially midway of the length thereof by means of staples 29 and 30 or by any other suitable means. A reel of tape 31 is inserted in the box in the same manner as the reel 20, described above in connection with FIG. 1, and the band 26 and member 9 operate in exactly the same manner to retain the reel therein and prevent inadvertent unwinding of tape thereon. The band 26 may, of course, be renewed if necessary, by merely removing the staples 29 and 30 and stapling a new band in place.

Figure 4:
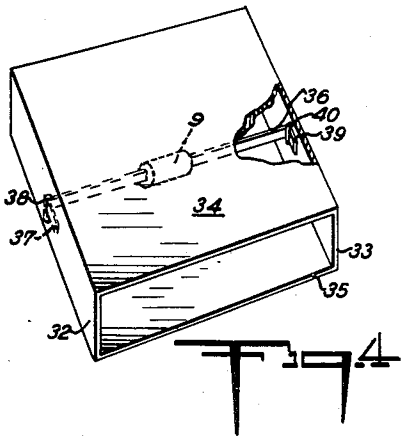
FIG. 4 is a view in perspective, showing another form of housing providing a sleeve open at both ends and with the band secured to opposite side walls.

In FIG. 4 there is shown another modified form of housing of the sleeve type which may well comprise side walls 32 and 33, a top wall 34, and a bottom wall 35, thereby providing a box open at opposite ends and, obviously a reel of tape may be inserted from either end of such box. The tape retaining means utilized in this form of the invention comprises a band 36 extending across the interior of the box substantially midway of the length thereof and having an enlarged member 9 associated therewith. The end 37 of the band 36 may be secured to the side wall 32 by a staple 38 or other suitable means and, likewise, the end 29 of the band 36 may be secured to the side wall 33 by a similar staple or other suitable means 40. Of course, in utilizing this form of the invention, it is understood that, after insertion of the reel of tape within the box, a suitable cover, such as an open-ended box, will be applied thereto to close the end of the box and retain the reel therein with the elastic band 36 engaging the tape to prevent inadvertent unwinding thereof.

Figure 5:
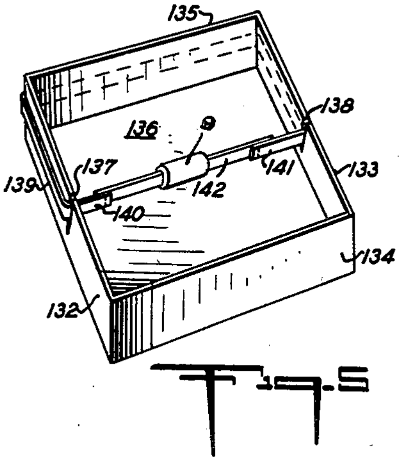
FIG. 5 is a view of a similar type of housing, but in which the tape retaining means comprises an elastic band provided with a non-elastic insert and a member associated therewith having a thickness greater than the thickness of said band for engaging the tape on the reel to be retained therein.

FIG. 5 shows an arrangement similar to FIG. 1 in which the box comprises side walls 132 and 133, end walls 134 and 135 and a bottom wall 136 providing a box open at the top. Side wall 132 is provided with a slit 137 substantially midway of the length thereof and side wall 133 is provided with a slit 138 substantially midway of the length thereof and opposite the slit 137. An elastic band 139 extends around the end wall 135 and portions of the side walls 132 and 133 with the ends 140 and 141 of the band 139 extending through the slits 137 and 138 respectively. Connecting the ends 140 and 141 of the band 139 is a strip 142 of non-elastic material, such as a suitable plastic or the like, and this strip 142 is maintained in a tensioned condition by the elastic band 139. Member 9 is associated with strip 142 and may be integral therewith or slidable thereon. The reel of tape is disposed in the box in this form of the invention in the same manner as described above, in connection with FIG. 1, and the main difference is that the tape is engaged by the non-elastic strip 142 and member 9, and the reel held in place, due to the elasticity of the band 139 and the tape prevented from unwinding by engagement therewith of the strip 142 and member 9.

Figure 6:
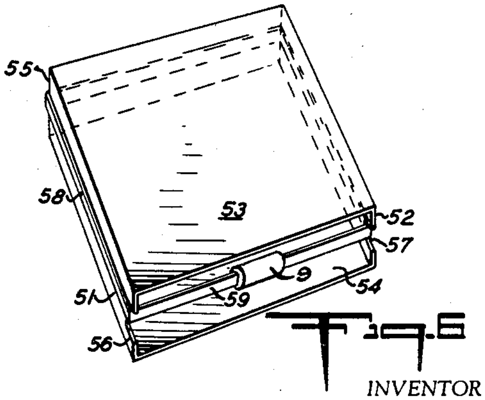
FIG. 6 is a view in perspective, showing a housing open at one end and in which the tape retaining means extends entirely around such housing and across the open end.

In FIG. 6, there is shown a housing and tape retaining means consisting of box having side walls 51 and 52, a top wall 53, a bottom wall 54, and an end wall 55, thereby providing a box open at one end. The side wall 51 is provided with a notch 56 at the open end of the box and, likewise, the side wall 52 is provided with a notch 57 at the open end of the box. An endless elastic band 58 extends entirely around the side walls 51 and 52 and the end wall 55 of the box, and a portion 59 of the band 58 extends through the notches 56 and 57 and across the open end of the box. In inserting a reel of tape in the housing of this form of the invention, such reel is inserted with the tape contacting the member 9 on the portion 59 of the band 58 at the open end of the box and between the top wall 53 and the bottom wall 54 and entirely into the box until such time as the reel approaches the end 55. If desired, a cover may be provided to be applied over the box from the open end thereof.

Figure 7:
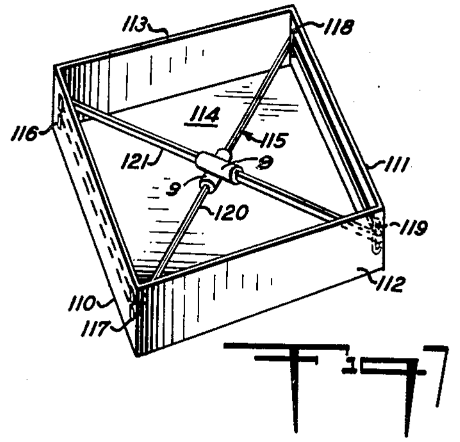
FIG. 7 is a view in perspective, showing a box for receiving two reels of tape and in which the tape retaining means comprises an endless elastic band twisted to form an X, with one portion of the band crossing the other band at a different elevation, the lower band serving to engage one reel of tape and the upper band serving to engage a second reel of tape.

The form of the invention shown in FIG. 7 provides a housing and a tape retaining means for two reels of tape and comprises side walls 110 and 111, end walls 112 and 113, and a bottom wall 114 providing a box open at the top. An endless band 115 is twisted to form a cross, with portions of the band secured by staples or other suitable fastening means 116 and 117 at spaced points to the side wall 110 and with the opposite end of the band 115 secured by staples or other suitable fastening means 118 and 119 at spaced points to the side wall 111, thereby providing a lower band 120 extending between diagonally opposite corners and an upper band 121 extending between the other diagonally opposite corners. In utilizing this form of the invention, a reel of tape is first inserted in the box in engagement with the member 9 on the lower portion of the band 120 and moved into position with the sides of the reel urged against the end wall 112 and the side wall 111, or, if desired, of course, the reel could be disposed on the other side of the lower band 120. After installation of the lower reel, the second reel may be inserted in the box with the same engaging the member 9 of the upper band 121 on either side thereof and, obviously, both reels of tape will be retained in the box and the tape wound thereon prevented from unwinding by engagement of the band portions 120 and 121 therewith.

Figure 8:
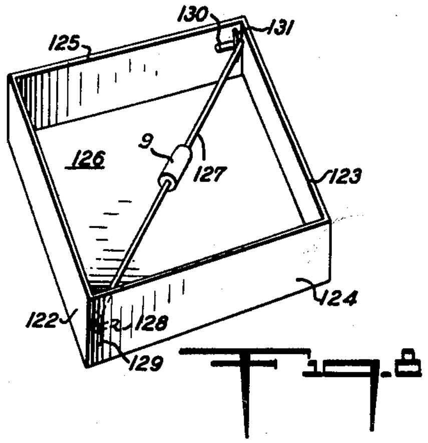
FIG. 8 is a view similar to FIG. 7, but showing a tape retaining means in the form of a band extending between diagonally opposite corners of the box and intended to engage a single reel of tape.

FIG. 8 shows a box comprising side walls 122 and 123, end walls 124 and 125, and a bottom wall 126 providing a box open at the top. Disposed within the box and extending substantially between diagonally opposite corners is a band 127 having a member 9 associated therewith, and one end 128 of the band may be conveniently secured to the end wall 124 by a staple or other suitable fastening means 129 at a location adjacent that corner of the box. The opposite end 130 of the band 127 may be secured to the end wall 125 adjacent the opposite corner of the box by a staple or other suitable fastening means 131. The reel of tape may be disposed in the box on either side of the diagonally disposed band 127, and such band with member 9 will, of course, be disposed between the flanges of the reel in engagement with the tape thereon to retain the reel in the box and prevent unwinding of the tape.

Figure 9:
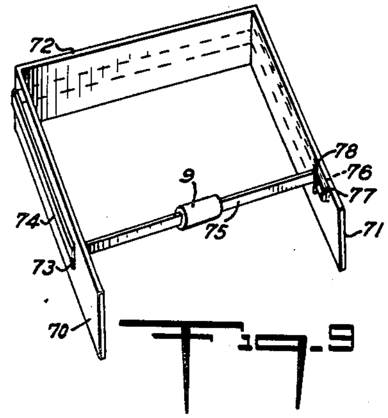
FIG. 9 is a view in perspective, showing a still further form of housing provided with side walls and a single end wall and in which the tape retaining means extends between the side walls and around the end wall.
Figure 10:
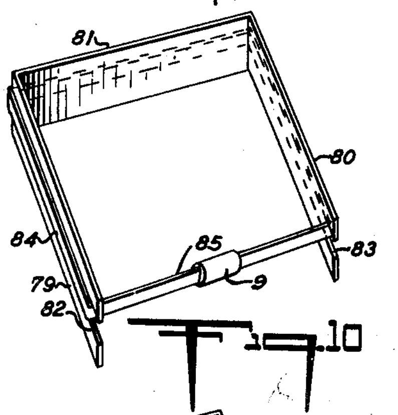
FIG. 10 is a perspective view showing a housing similar to that shown in FIG. 9, and in which the tape retaining means extends across the ends of the side walls and also entirely around the remainder of the housing.

In FIG. 9 there is shown a box comprising side walls 70 and 71 and an end wall 72, which result in a box open at the top and bottom and at one end. A slit 73 is provided in the side wall 70 and a band 74 extends through the slit 73 to provide a portion 75 disposed within the box and extending thereacross, the band 74 also extending around the end wall 72 and along the side wall 71 to provide an end 76 disposed on the outside of side wall 71 substantially opposite the end 77 of the portion 75 of the band 74. Ends 76 and 77 of the band 74 may be conveniently secured to the side wall 71 by a staple or other suitable means 78 extending through the side wall 71 and engaging both of the ends 76 and 77. In this form of the invention, the reel of tape is disposed between the portion 75 of the band 74 and the end wall 72, and due to the resiliency of such band or the member 9, the reel is securely held in place and the tape thereon prevented from unwinding. Once again it is assumed that the box of this form of the invention will be enclosed in a suitable cover to fully protect the reel of tape contained therein. The structure shown in FIG. 10 is somewhat similar to that described above in connection with FIG. 9, and may comprise side walls 79 and 80 together with an end wall 81 thereby providing a box open at the top and bottom and at one end. Side wall 79 is provided with a notch 82 at the free end thereof, and side wall 80 is provided with a similar notch 83 at the free end thereof. An endless band 84 extends entirely around the side walls 79 and 80 as well as the end wall 81 and through the notches 82 and 83 to provide a portion 85 extending across the open end of the box. The member 9 is located on the portion 85. The reel of tape is positioned in the box with one side thereof in engagement with the end wall 81 and with the member 9 of the portion 85 of the band 84 disposed between the reel flanges at the opposite side of the reel and engaging the tape thereon. This engagement of the member 9 of the band 84 serves to retain the reel within the box and, at the same time, prevent unwinding of the tape thereon. If desired, a suitable cover may enclose the entire box and protect the reel and tape therein.

Figure 11:
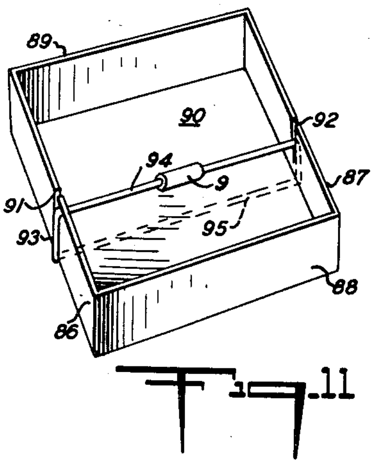
FIG. 11 is a view in perspective, showing a housing consisting of a box open at the top and in which the tape retaining means extends through slits in the side walls of the box and around the bottom of such box.

The modified form of the invention shown in FIG. 11 is somewhat similar to that described above in connection with FIG. 1, in that there is provided a box having side walls 86 and 87 and end walls 88 and 89 and a bottom wall 90 providing a box open at the top. A slit 91 is provided into the side wall 86 substantially midway of the length thereof, and a similar slit 92 is provided in the side wall 87 opposite the slit 91. An endless band 93 is disposed in the slit 91 and 92 with a portion 94 thereof extending across the box and with the remainder of the band 93 extending around the bottom of the box, as shown in dotted lines at 95 in FIG. 11. The member 9 is located on the portion 94. The box of this form of the invention may be provided with a hinged top, as described above in connection with FIG. 1, or a separate top may be utilized, if desired, to properly enclose the same. A reel of tape is inserted in the box in the same way as the form of the invention shown in FIG. 1, in that the member 9 on the portion 94 of the band 93 within the box engages the tape between the flanges of the reel and securely holds the reel in the box and, at the same time, prevents inadvertent unwinding of the tape. Obviously, the band 93 may be conveniently replaced by simply removing the same and inserting a new band in the slit 91 and 92 and applying the same around the box, as shown.

Figure 12:
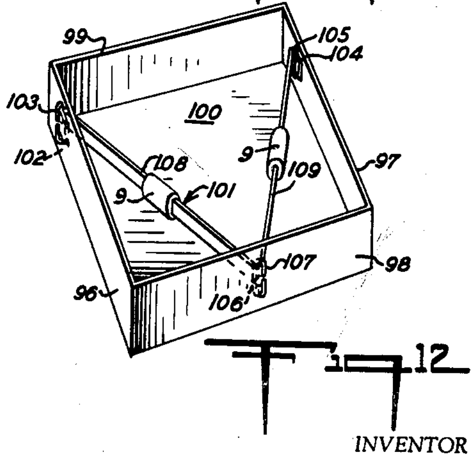
FIG. 12 is a view in perspective, showing another form of housing and tape retaining means in which the housing is a box open at the top and in which the tape retaining means comprises an elastic band secured to the side walls and one end wall of the box to provide a V-shaped tape engaging band.

The housing and tape retaining means shown in FIG. 12 comprises side walls 96 and 97, end walls 98 and 99, and a bottom wall 100, providing a box open at the top and a band 101 is disposed in the box with one end 102 thereof secured to the side wall 96 by suitable means, such as a staple 103 and it is to be noted that the end 102 of the band 101 is located adjacent the end wall 99. Similarly, the end 104 of the band 101 is secured to the side wall 97 by suitable means, such as a staple 105, and once again the end 104 is located substantially opposite the end 102 and adjacent the end wall 99. The mid-point 106 of the band 101 is secured to the end wall 98 by suitable means, such as a staple 107, and this staple is located substantially midway of the length of the end wall 98 to provide a band of substantially V-shape having legs 108 and 109 extending at an angle to the side walls 96 and 97 of the box. In use, a reel of tape is disposed in the box with the members 9 on legs 108 and 109 of the band 101 engaging the tape between the flanges of the reel and on opposite sides thereof to urge the reel into contact with the end wall 99 of the box and thereby retain the reel in place and prevent inadvertent unwinding of the tape.

Figure 13:
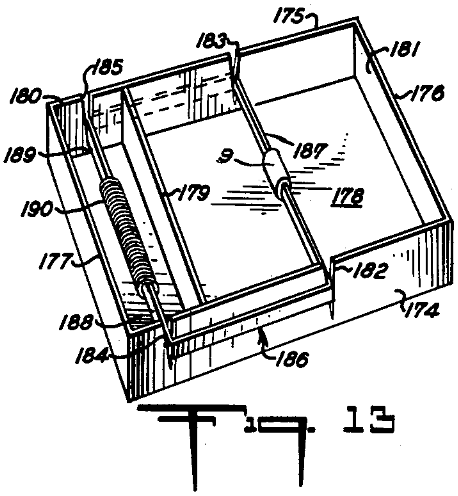
FIG. 13 is a view in perspective, showing an open top box having a partition therein providing two compartments and in which the reel of tape is disposed in one compartment and in which a tension spring is provided in the second compartment connecting the ends of a non-elastic band which, in turn, engages the tape on the reel disposed in the first compartment.

A somewhat more complex form of the invention is shown in FIG. 13 and may well comprise side walls 174 and 175, end walls 176 and 177, and a bottom wall 178, providing a box open at the top. A partition 179 connects the side walls 174 and 175 a relatively short distance from the end wall 177 to provide a relatively narrow compartment 180 between the end wall 177 and 179 and a relatively wide compartment 181 between the partition 179 and the end wall 176. Substantially midway between the end wall 176 and partition 179 there are provided slits 182 and 183 in side walls 174 and 175, respectively, and substantially midway between the partition 179 and end wall 177 there are provided slits 184 and 185 in the side walls 174 and 175, respectively.

A non-elastic band 186 is disposed in the slits 182 and 183 providing a portion 187, which has a member 9 associated therewith, the portion 187 extending across the compartment 181. The band 186 extends along the side walls 174 and 175 with the ends thereof projecting through the slits 184 and 185 into the narrow compartment 180. The ends 188 and 189 of the non-elastic band 186 are connected by a tension spring 190 disposed in the narrow compartment 180, and this spring 190 serves to hold the band 186 and the portion 187 thereof within the compartment 181 under tension. The non-elastic band 186 may be of flexible metal, plastic, or any other suitable material. In this form of the invention, the reel of tape is placed in the relatively wide compartment 181 at either side of the portion 187 of the band 186 and is held therein in the same manner as described above in connection with the form of the invention shown in FIG. 1. The member 9 on the portion 187 of the tape 186, of course, is disposed between the flanges of the reel and engages the tape thereon to prevent inadvertent unwinding.

Figure 14:
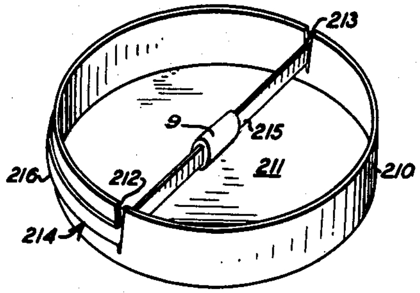
FIG. 14 is a view in perspective, showing a circular housing for receiving a reel of tape and in which the tape retaining means comprises an endless band extending diametrically across the housing, and a member associated therewith having a thickness greater than the thickness of said band, and intended to engage the tape on a reel placed therein.

FIG. 14 shows a circular box provided by a circular side wall 210 and a bottom wall 211, and such box is open at the top. The side wall 210 is provided with diametrically opposed slits 212 and 213, and an endless band 214 is disposed in the slits 212 and 213, with a portion 215 thereof having the member 9 associated therewith extending diametrically across the box, and with a portion 216 extending around half of the circumference of the box. In utilizing this form of the invention, the reel of tape is disposed in the box on either side of the portion 215 of the band 214 and is held therein and the tape prevented from unwinding by engagement of the member 9 on the portion 215 with the tape on such reel. Of course, if desired, a circular cover may be provided for completely enclosing the reel housed in the box.

An album type housing and tape retaining means is shown in FIG. 15 and may well comprise a back cover 253 of relatively stiff material, substantially rectangular in shape and of a size to accommodate the reel of tape which it is desired to house therein. An upstanding stud 254 is provided on the inner side of the back cover 253, and the stud 254 is adapted to be received in the spindle receiving aperture of the reel. An upstanding flange 255 is provided on one edge 256 of the back cover 253, and hingedly secured to the upper edge 257 of the flange 255 is a front cover 258, also formed of relatively stiff material. An elastic band 259 is secured at its ends 260 and 261 to the flange 255 by suitable fastening means, such as staples or the like 262 and 263. This band has a member 9 associated therewith. Of course, any other fastening means, such as rivets or an adhesive may be employed to secure the elastic band 259 to the flange 255. As will be noted from an inspection of FIG. 15, the ends 260 and 261 of the elastic band 259 are spaced a substantial distance apart and the band 259 extends outwardly above and along the back cover member 253 to a point somewhat beyond the stud 254. The elastic band 259 may, if desired, be provided with an integral finger engaging tab 264 adjacent member 9, although such tab may, if desired, be formed separately and attached to the band in any desired manner.

In utilizing this album type housing and tape retaining means, it is only necessary to place a reel of tape on the back cover member 253 with the stud 254 received in the spindle receiving aperture of the reel, and thereupon the finger engaging tab 264 may be grasped in the fingers of the user and band 259 stretched so as to place member 9 between the flanges of the reel and in engagement with the tape thereon to securely hold the reel in place on the stud 254 and also, at the same time, prevent inadvertent unwinding of the tape on such reel. The front cover 258 may then be closed and the reel and tape thereon is housed in an album or book type cover and may be conveniently filed for storage.

A reel supporting and tape holding means is shown in FIG. 16 and, as shown therein, comprises a flat, substantially rectangular base 265 which may be formed of cardboard, plywood, plastic, or any other suitable material and of a size to support a reel of tape thereon. Substantially centrally of the base 265 there is provided an upstanding stud 266 adapted to engage in the spindle receiving aperture of the tape reel. Notches 267 and 268 are provided in opposite side edges of the base 265 and disposed around such base, and extending through the notches 267 and 268 is an endless retaining band 269. Of course, if desired, an endless band need not be used, and the same may be secured to the base 265 in any desired manner. The band 269 is provided substantially midway of the length thereof above the base 265, with an enlarged portion 270 which may be in the form of a sleeve received around the band 269, or may be an integral enlargement of the band itself. This enlarged portion 270 is received between the flanges of the reel and serves to engage the tape thereon and, at the same time, prevent entry of the band between the tape and the flange of the reel. In this form of the invention it is only necessary to place a reel of tape on the base 265 with the stud 266 disposed in the spindle receiving aperture of the reel, and upon engagement of the enlarged portion 270 between the flanges of the reel and with the tape thereon, the band 269 will serve to retain the reel in position and prevent unwinding of the tape.

A reel chest and tape retaining means is shown in FIG. 17 and may well comprise a relatively low front wall 271 and a relatively high rear wall 272 connected by trapezoidal shaped end walls 273 and a bottom wall, not shown, which provides a chest having an inclined top. A plurality of partitions 274 extend between the front and rear walls 271 and 272, respectively, to provide a plurality of compartments 275, each adapted to receive a reel of tape.

Two forms of the invention are shown in FIG. 17, and in one form a notch 276 is provided in the front wall 271 in the upper edge thereof and substantially midway of each compartment 275, and a similar notch 277 is provided in the upper edge of the rear wall 272 substantially midway of each compartment 275. An endless band having a tape contacting member 9 associated therewith extends around the bottom, front, and rear walls of the box and through the notches 276 and 277 and lengthwise of each compartment 275 adjacent the upper end thereof. A reel of tape may be disposed in each compartment by sliding the same between the portion 279 of the band 278 within the compartment and the partition 275 until the same is positioned entirely within the compartment 275, at which time the member 9 on portion 279 of the band 278 may be positioned between the flanges of the reel and in engagement with the tape thereon, to retain the reel in the compartment and prevent unwinding of the tape on such reel. In this way a plurality of reels may be housed in a single chest and the tape prevented from unwinding therefrom, such reels being readily available for use at any time.

The other form of the invention shown in FIG. 17 merely involves a change in the method of applying the band with member 9, and in this case a retaining band 280 extends lengthwise of each compartment 275 and over the upper edges of the front wall 271 and rear wall 272, the ends 281 and 282 of the band 280 being secured to the front wall and rear wall, respectively, by staples or other suitable fastening means 283 and 284. A reel of tape is disposed in the compartment in this form of the invention in the same manner as above described in connection with the first form of the invention shown in this figure.

It is to be understood that the forms of the invention as shown in FIGS. 2, 5, 7, 8, 9, 10, 11, 12, 13, and 14, all of which are what may be termed an insert type, may be received in a box such as that shown in FIG. 6, wherein one end is open and one end is closed.

It is also to be understood that instead of a predetermined length of a flexible band which is stapled to the box an endless flexible band may be employed, and in this case, instead of stapling, slits will be provided such as those shown at 17 and 18 in FIG. 1 and elsewhere in the drawings. These modifications could be made with respect to the forms of the invention shown in FIGS. 2, 7, 8, 9, and 12.

There have been described above many different forms of means for housing a reel of tape and for preventing inadvertent unwinding of the tape thereon, and it will be noted that each form of the invention operates to efficiently perform the desired function and may be provided in accordance with the personal preference of the user. All of the forms of the invention may be economically manufactured and provided at a minimum cost, thereby permitting efficient and safe storage of reels of tape which will securely retain the tape wound thereon. It is also to be noted that all forms of the invention may be applied to or removed from a reel of tape without intricate manual operations and that, consequently, no difficulty should be experienced in utilizing the same.

It will be obvious to those skilled in the art that various changes may be made in the invention without departing from the spirit and scope thereof and therefore the invention is not limited by that which is shown in the drawing and described in the specification, but only as indicated in the appended claims.

I claim:

1. A combined reel housing and reel tape retaining means comprising two substantially parallel walls and a bottom wall connecting said parallel walls providing a generally rectangular box, a band extending from the mid portion of one of said walls to the mid portion of the other and a member mounted on said band, having a thickness greater than the thickness of said band, said thickness being approximately equal to the thickness between the flanges of said reel, a flat reel of tape disposed in said box with said band and said member engaging the tape thereon retaining said reel in said box and preventing said tape from unwinding from said reel and also preventing entry of the band between a flange of said reel and said tape.

2. A combined housing and reel tape retaining means, as set forth in claim 1, wherein said band is formed of elastic material and said tape engaging member is formed of elastic material.

3. A combined housing and reel tape retaining means, as set forth in claim 1, wherein said member is formed of elastic material and said band is formed of inelastic material.

4. A combined housing and reel tape retaining means, as set forth in claim 1, wherein said member is formed of inelastic material and said band is formed of elastic material.

5. A combined housing and reel tape retaining means, as set forth in claim 1, wherein said box is also provided with two additional parallel walls and wherein said band extends through slits in one pair of such walls and around the exterior of one wall of the other set.

References Cited in the file of this patent

UNITED STATES PATENTS

| | | |
|---|---|---|
| 623,334 | Perkins | Apr. 18, 1899 |
| 1,496,491 | Ringler | June 3, 1924 |
| 1,686,650 | Chanier | Oct. 9, 1928 |
| 1,797,539 | Arthur | Mar. 24, 1931 |
| 1,842,034 | Lewis | Jan. 19, 1932 |
| 2,151,025 | Goldberg | Mar. 21, 1939 |
| 2,172,675 | Goldberg | Sept. 12, 1939 |
| 2,867,318 | Kulka | Jan. 6, 1959 |

FOREIGN PATENTS

| | | |
|---|---|---|
| 452,262 | Germany | Nov. 8, 1927 |
| 324,334 | Great Britain | Jan. 20, 1930 |